(12) United States Patent
Boardman (10) Patent No.: US 12,540,573 B2
(45) Date of Patent: Feb. 3, 2026

(54) MODULATING FLUID FLOW WITHIN A TURBINE ENGINE USING STEAM

(71) Applicant: Raytheon Technologies Corporation, Farmington, CT (US)

(72) Inventor: Gregory Boardman, Owens Cross Roads, AL (US)

(73) Assignee: RTX CORPORATION, Farmington, CT (US)

( * ) Notice: Subject to any disclaimer, the term of this patent is extended or adjusted under 35 U.S.C. 154(b) by 107 days.

(21) Appl. No.: 18/120,821

(22) Filed: Mar. 13, 2023

(65) Prior Publication Data

US 2024/0309806 A1    Sep. 19, 2024

(51) Int. Cl.
    *F02C 3/30*    (2006.01)

(52) U.S. Cl.
    CPC ............ *F02C 3/30* (2013.01); *F05D 2220/32* (2013.01); *F05D 2240/35* (2013.01); *F05D 2270/08* (2013.01)

(58) Field of Classification Search
    CPC ............... F02C 3/30; F02C 3/32; F02C 3/305
    See application file for complete search history.

(56) References Cited

U.S. PATENT DOCUMENTS

| | | | |
|---|---|---|---|
| 3,747,336 A | 7/1973 | Dibelius | |
| 5,054,279 A | 10/1991 | Hines | |
| 6,370,862 B1 | 4/2002 | Cheng | |
| 8,813,473 B2 | 8/2014 | Fletcher | |
| 2014/0338359 A1* | 11/2014 | Valeev | F23R 3/36 60/776 |
| 2015/0369126 A1 | 12/2015 | Knöpfel | |
| 2016/0230995 A1 | 8/2016 | Koganezawa | |

FOREIGN PATENT DOCUMENTS

| | | |
|---|---|---|
| JP | 2000027660 A | 1/2000 |
| JP | 2002004878 A | 1/2002 |

OTHER PUBLICATIONS

EP Search Report for EP Patent Application No. 24151958.6 dated Jun. 25, 2024.

* cited by examiner

*Primary Examiner* — Gerald L Sung
*Assistant Examiner* — Jacek Lisowski
(74) *Attorney, Agent, or Firm* — Getz Balich LLC (57) ABSTRACT

An assembly is provided for a turbine engine. This assembly includes a combustor and an injection system. The combustor includes a combustion chamber. The injection system includes an injector. The injection system is configured to direct fluid and steam into the combustion chamber through the injector. The injection system is configured to modulate a flow of the fluid into the combustion chamber through the injector by regulating a flow of the steam into the combustion chamber through the injector.

20 Claims, 9 Drawing Sheets

MODULATING FLUID FLOW WITHIN A TURBINE ENGINE USING STEAM

This invention was made with Government support under DE-AR0001561 awarded by the Department of Energy, Office of ARPA-E. The Government has certain rights in this invention.

BACKGROUND OF THE DISCLOSURE

1. Technical Field

This disclosure relates generally to a turbine engine and, more particularly, to utilizing steam during operation of the turbine engine.

2. Background Information

As government emissions standards tighten, interest in alternative fuels for gas turbine engines continues to grow. There is interest, for example, in fueling a gas turbine engine with hydrogen ($H_2$) fuel rather than a traditional hydrocarbon fuel such as kerosine to reduce greenhouse emissions. Combustion products produced by combusting hydrogen ($H_2$) fuel include water vapor. Various systems and methods are known in the art for recovering the water vapor. Various system and methods are also known in the art for producing and utilizing steam from the recovered water vapor. While these known systems and methods have various advantages, there is still room in the art for improvement.

SUMMARY OF THE DISCLOSURE

According to an aspect of the present disclosure, an assembly is provided for a turbine engine. This assembly includes a combustor and an injection system. The combustor includes a combustion chamber. The injection system includes an injector. The injection system is configured to direct fluid and steam into the combustion chamber through the injector. The injection system is configured to modulate a flow of the fluid into the combustion chamber through the injector by regulating a flow of the steam into the combustion chamber through the injector.

According to another aspect of the present disclosure, another assembly is provided for a turbine engine. This assembly includes a structure and an injection system. The structure includes an internal volume. The injection system includes an injector and a steam ejector projecting partially into an inner passage of the injector. The injection system is configured to direct fluid and steam into the internal volume through the inner passage of the injector. The injection system is configured to: increase a flow of the fluid through the inner passage of the injector into the internal volume by staring or increasing a flow of the steam out of the steam ejector into the inner passage of the injector; and/or decrease the flow of the fluid through the inner passage of the injector into the internal volume by stopping or decreasing the flow of the steam out of the steam ejector into the inner passage of the injector.

According to still another aspect of the present disclosure, a method is provided for operating a turbine engine. During this method, fluid and steam are directed into a combustion chamber of a combustor within the turbine engine through an injector. A flow of the fluid into the combustion chamber is modulated through the injector by regulating a flow of the steam into the injector.

The modulating may include increasing the flow of the fluid into the combustion chamber through the injector by starting or increasing the flow of the steam into the injector.

The modulating may include decreasing the flow of the fluid into the combustion chamber through the injector by stopping or decreasing the flow of the steam into the injector.

The method may also include: injecting a fuel-air mixture into the combustion chamber; combusting the fuel-air mixture to generate combustion products; and quenching the combustion products within the combustion chamber using the flow of the fluid, the fluid comprising compressed air.

The method may also include: injecting fuel into the combustion chamber; mixing the fuel with the fluid to provide a fuel-air mixture; and combusting the fuel-air mixture within the combustion chamber. The fluid may be or otherwise include compressed air.

The method may also include: directing compressed air into the combustion chamber; mixing the fluid with the compressed air to provide a fuel-air mixture; and combusting the fuel-air mixture within the combustion chamber. The fluid may be or otherwise include fuel.

The assembly may also include a turbine engine core. The turbine engine core may also include a compressor section, a combustor section, a turbine section and a core flowpath. The core flowpath may extend sequentially through the compressor section, the combustor section and the turbine section. The core flowpath may include the internal volume.

The injection system may be configured to increase the flow of the fluid into the combustion chamber through the injector by increasing the flow of the steam into the combustion chamber through the injector.

The injection system may be configured to increase the flow of the fluid into the combustion chamber through the injector by starting the flow of the steam into the combustion chamber through the injector.

The injection system may be configured to decrease the flow of the fluid into the combustion chamber through the injector by decreasing the flow of the steam into the combustion chamber through the injector.

The injection system may be configured to decrease the flow of the fluid into the combustion chamber through the injector by stopping the flow of the steam into the combustion chamber through the injector.

The injection system may also include a steam ejector. The injection system may be configured to direct the steam out of the steam ejector into the injector to modulate the flow of the fluid into the combustion chamber through the injector.

The injector may include an inner passage fluidly coupled with the combustion chamber. At least a portion of the inner passage may radially taper inward towards an axis as the portion of the inner passage extends axially along the axis towards the combustion chamber. The steam ejector may project axially along the axis into the portion of the inner passage.

The injector may also include a sidewall forming an outer peripheral boundary of the portion of the inner passage. An annulus may extend radially between the steam ejector and the sidewall. The annulus may circumscribe the steam ejector.

The combustor may be disposed within a diffuser plenum. The injector may fluidly couple the diffuser plenum to the combustion chamber. The fluid may be or otherwise include compressed air within the diffuser plenum.

The assembly may also include an air swirler structure, and the air swirler structure may include the injector.

The assembly may also include a fuel injector assembly, and the fuel injector assembly may include the injector.

The injector may form a quench aperture in a wall of the combustor.

The assembly may also include a compressed air source. The fluid may be compressed air received from the compressed air source.

The assembly may also include a fuel source. The fluid may be fuel received from the fuel source.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
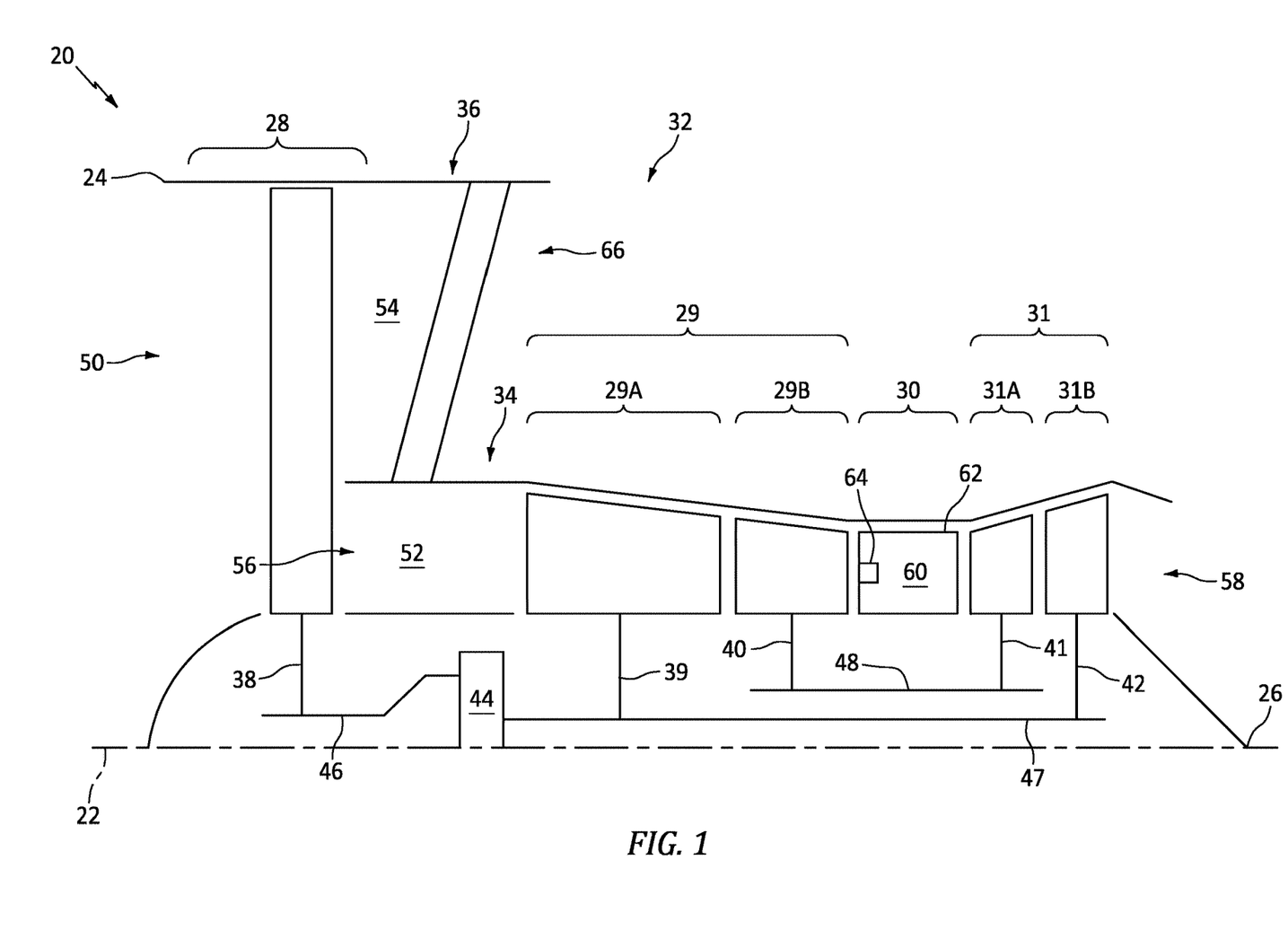
FIG. 1 is a partial schematic illustration of a gas turbine engine.

FIG. 1 is a side sectional illustration of a gas turbine engine 20 for an aircraft propulsion system. This turbine engine 20 extends axially along an axial centerline 22 between a forward, upstream end 24 and an aft, downstream end 26. The turbine engine 20 includes a fan section 28, a compressor section 29, a combustor section 30 and a turbine section 31. The compressor section 29 of FIG. 1 includes a low pressure compressor (LPC) section 29A and a high pressure compressor (HPC) section 29B. The turbine section 31 of FIG. 1 includes a high pressure turbine (HPT) section 31A and a low pressure turbine (LPT) section 31B.

The engine sections 28-31B of FIG. 1 are arranged sequentially along the axial centerline 22 within an engine housing 32. This engine housing 32 includes an inner case 34 (e.g., a core case) and an outer case 36 (e.g., a fan case). The inner case 34 may house one or more of the engine sections 29A-31B; e.g., a core of the turbine engine 20. The outer case 36 may house at least the fan section 28.

Each of the engine sections 28, 29A, 29B, 31A and 31B includes a respective bladed rotor 38-42. Each of these bladed rotors 38-42 includes a plurality of rotor blades arranged circumferentially around and connected to one or more respective rotor disks and/or hubs. The rotor blades, for example, may be formed integral with or mechanically fastened, welded, brazed, adhered and/or otherwise attached to the respective rotor disk(s) and/or the respective hub(s).

The fan rotor 38 is connected to a geartrain 44, for example, through a fan shaft 46. The geartrain 44 and the LPC rotor 39 are connected to and driven by the LPT rotor 42 through a low speed shaft 47. The HPC rotor 40 is connected to and driven by the HPT rotor 41 through a high speed shaft 48. The engine shafts 46-48 are rotatably supported by a plurality of bearings; e.g., rolling element and/or thrust bearings. Each of these bearings is connected to the engine housing 32 by at least one stationary structure such as, for example, an annular support strut.

During engine operation, air enters the turbine engine 20 through an airflow inlet 50 into the turbine engine 20. This air is directed through the fan section 28 and into a core flowpath 52 and a bypass flowpath 54. The core flowpath 52 extends sequentially through the engine sections 29A-31B (e.g., the engine core) from an inlet 56 into the core flowpath 52 to an exhaust 58 from the core flowpath 52. The air within the core flowpath 52 may be referred to as "core air". The bypass flowpath 54 extends through a bypass duct, and bypasses the engine core. The air within the bypass flowpath 54 may be referred to as "bypass air".

The core air is compressed by the LPC rotor 39 and the HPC rotor 40 and directed into a (e.g., annular) combustion chamber 60 of a (e.g., annular) combustor 62 in the combustor section 30. Fuel is injected by one or more fuel injector assemblies 64 (one visible in FIG. 1) into the combustion chamber 60 and mixed with the compressed core air to provide a fuel-air mixture. This fuel-air mixture is ignited and combustion products thereof flow through and sequentially cause the HPT rotor 41 and the LPT rotor 42 to rotate before being directed out of the turbine engine 20 through the core exhaust 58. The rotation of the HPT rotor 41 and the LPT rotor 42 respectively drive rotation of the HPC rotor 40 and the LPC rotor 39 and, thus, compression of the air received from the core inlet 56. The rotation of the LPT rotor 42 also drives rotation of the fan rotor 38, which propels the bypass air through the bypass flowpath 54 and out of the turbine engine 20 through an exhaust 66 from the bypass flowpath 54. The propulsion of the bypass air may account for a majority of thrust generated by the turbine engine 20.

Figure 2:
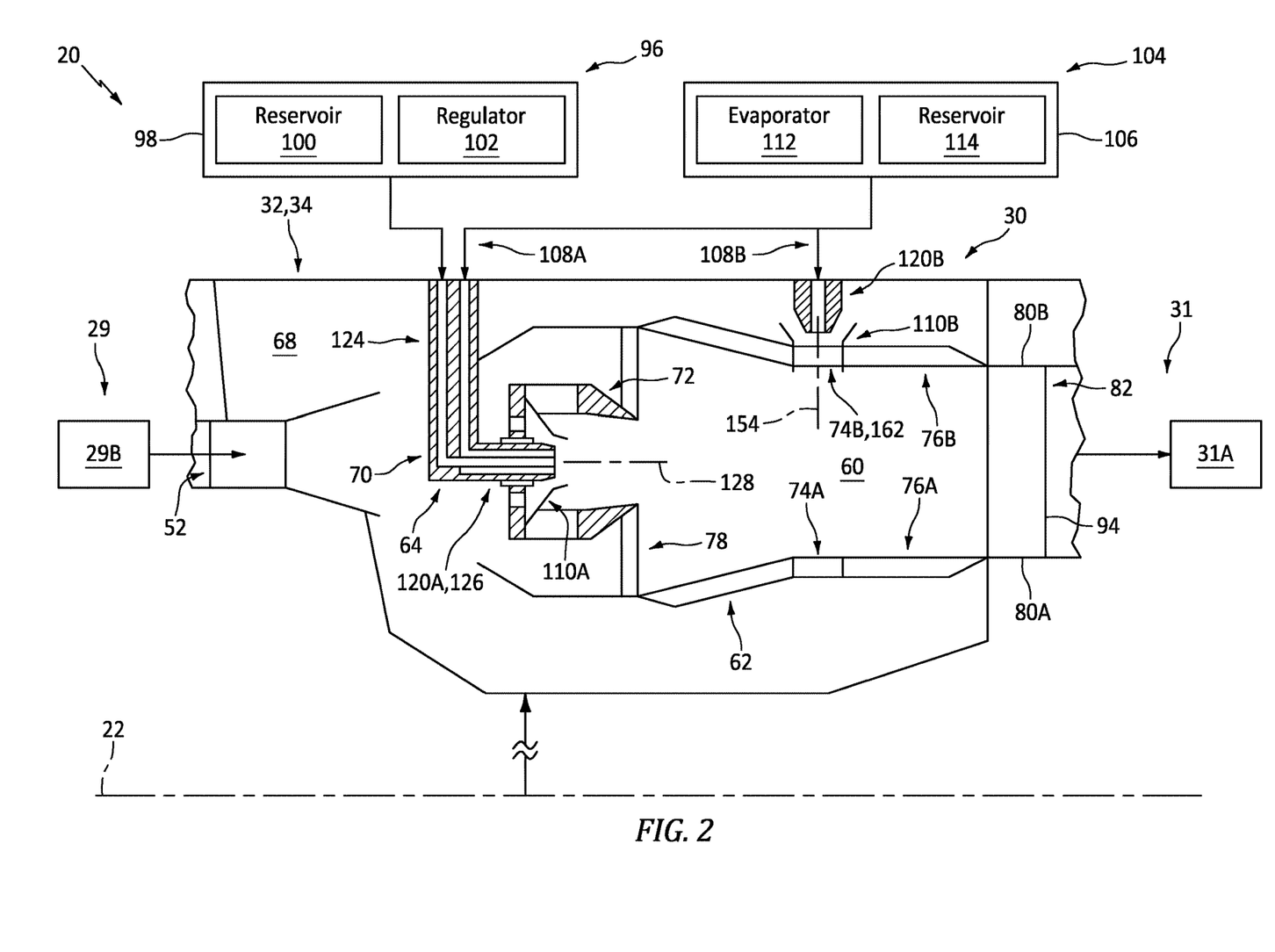
FIG. 2 is a partial schematic illustration of a combustor section between a compressor section and a turbine section.

FIG. 2 illustrate a portion of the combustor section 30 along the core flowpath 52 between the HPC section 29B and the HPT section 31A. This combustor section 30 includes the combustor 62, a diffuser plenum 68 and the one or more injector assemblies 64 (one visible in FIG. 2). Briefly, the combustor 62 is disposed within (e.g., surrounded by) the diffuser plenum 68. This diffuser plenum 68 receives the compressed core air from the HPC section 29B for subsequent provision into the combustion chamber 60. Each injector assembly 64 of FIG. 2 includes a fuel injector 70 mated with an air swirler structure 72. The fuel injector 70 injects the fuel into the combustion chamber 60. The air swirler structure 72 directs some of the core air from the diffuser plenum 68 into the combustion chamber 60 in a manner that facilitates mixing the core air with the injected fuel. One or more igniters (not shown) ignite the fuel-air mixture within the combustion chamber 60. One or more quench apertures 74A, 74B (generally referred to as "74") (e.g., dilution holes) in each wall 76A, 76B (generally referred to as "76") of the combustor 62 direct additional core air from the diffuser plenum 68 into the combustion chamber 60 to quench (e.g., stoichiometrically lean) the combustion products; e.g., the ignited fuel-air mixture.

Figure 3:
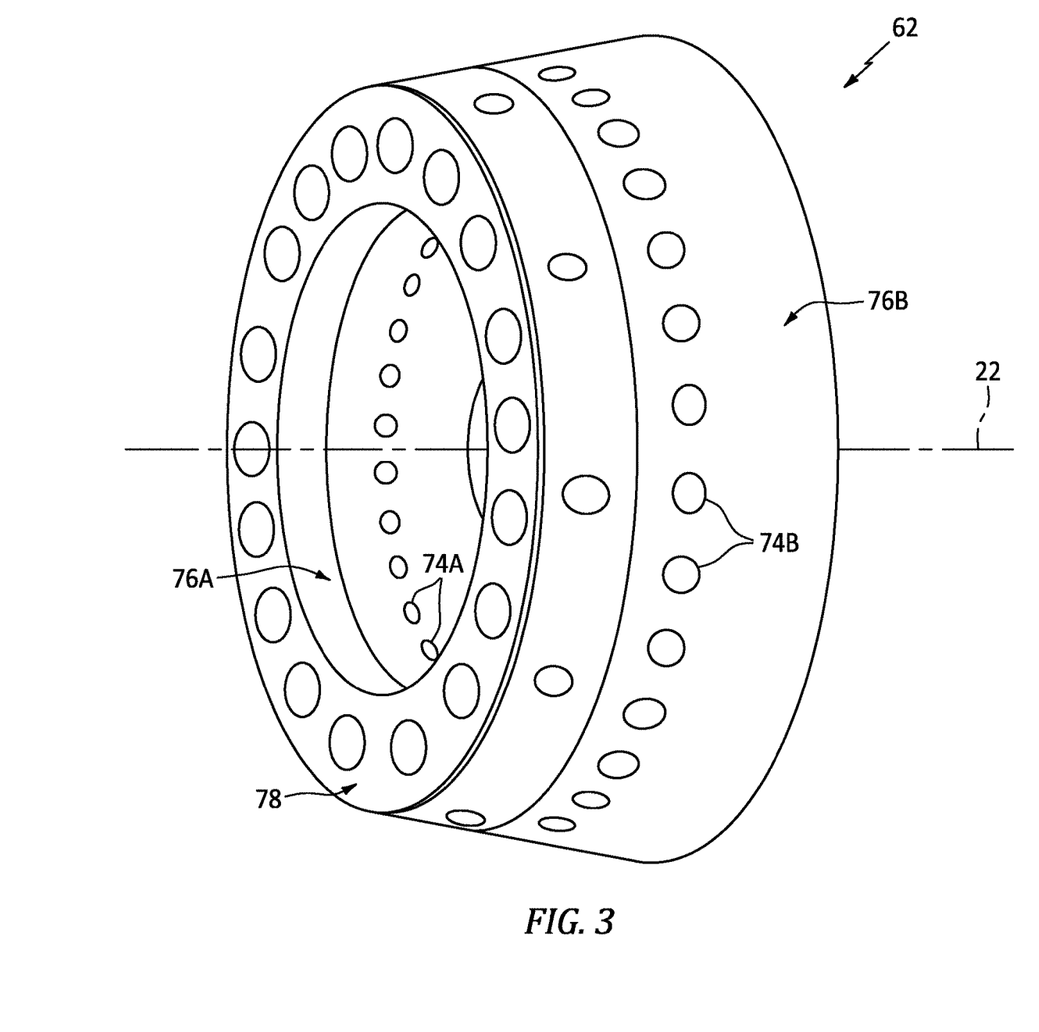
FIG. 3 is a perspective illustration of a combustor.

The combustor 62 may be configured as an annular combustor; e.g., an annular floating wall combustor. The combustor 62 of FIGS. 2 and 3, for example, includes an annular combustor bulkhead 78, the tubular inner combustor wall 76A ("inner wall"), and the tubular outer combustor wall 76B ("outer wall"). The bulkhead 78 of FIG. 2 extends radially between and to the inner wall 76A and the outer wall 76B. The bulkhead 78 may be connected (e.g., mechanically fastened or otherwise attached) to the inner wall 76A and/or the outer wall 76B. Each combustor wall 76 projects axially along the axial centerline 22 out from the bulkhead 78 towards the HPT section 31A. The inner wall 76A of FIG. 2, for example, projects axially to and may be connected to an inner platform 80A of a downstream stator vane array 82 in the HPT section 31A. The outer wall 76B of FIG. 2 projects axially to and may be connected to an outer platform 80B of the downstream stator vane array 82. With the arrangement of FIG. 2, the combustion chamber 60 is formed by and extends radially within the combustor 62 between and to the inner wall 76A and the outer wall 76B. The combustion chamber 60 is formed by and extends axially (in an upstream direction along the core flowpath 52) into the combustor 62 from the stator vane array 82 to the bulkhead 78. The combustion chamber 60 also extends within the combustor 62 circumferentially about (e.g., completely around) the axial centerline 22, which may configure the combustion chamber 60 as a full-hoop annulus.

Figure 4:
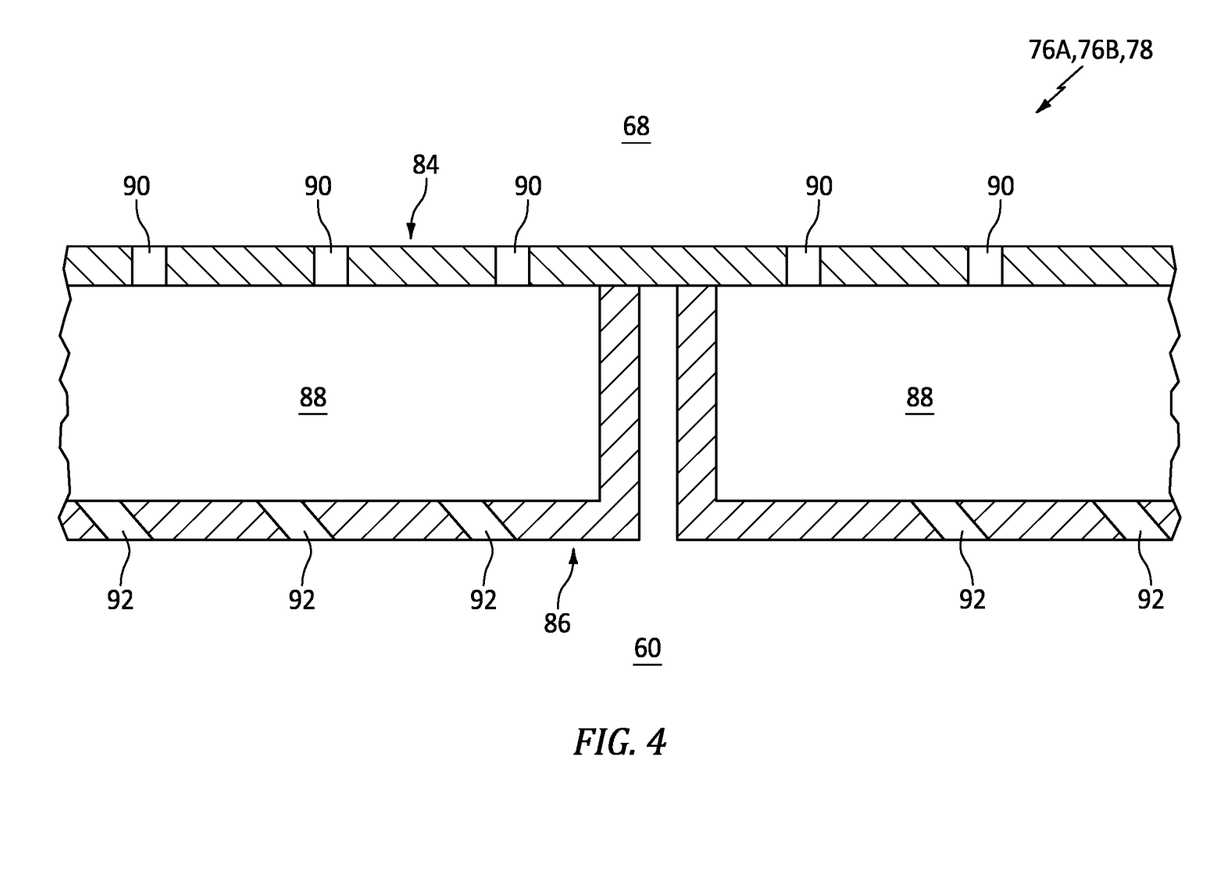
FIG. 4 is a partial sectional illustration of a combustor wall.

Referring to FIG. 4, any one or more or all of the walls 76A, 76B, 78 may each be configured as a multi-walled structure; e.g., a hollow, dual-walled structure. Each wall 76A, 76B, 78 of FIG. 4, for example, includes a combustor wall shell 84, a combustor wall heat shield 86 (e.g., a liner) and one or more combustor wall cooling cavities 88 (e.g., impingement cavities) formed by and (e.g., radially and/or axially) between the shell 84 and the heat shield 86. Each cooling cavity 88 of FIG. 4 is fluidly coupled with the diffuser plenum 68 through one or more cooling apertures 90 in the shell 84; e.g., impingement apertures. Each cooling cavity 88 of FIG. 4 is fluidly coupled with the combustion chamber 60 through one or more cooling apertures 92 in the heat shield 86; e.g., effusion apertures. Of course, various other multi-walled combustor wall structures are known in the art, and the present disclosure is not limited to any particular ones thereof. Furthermore, it is contemplated any one or more or all of the walls 76A, 76B and/or 78 of FIG. 2 may each alternatively be configured as a single-walled structure. The shell 84 of FIG. 4, for example, may be omitted and the heat shield 86 may form a single walled liner/wall. However, for ease of description, each wall 76A, 76B, 78 may each be described below as the hollow, dual-walled structure.

Referring to FIG. 2, the stator vane array 82 includes the inner platform 80A, the outer platform 80B and a plurality of stator vanes 94 (one visible in FIG. 2). The stator vanes 94 are arranged circumferentially about the axial centerline 22 in an array; e.g., a circular array. Each of these stator vanes 94 extends radially across the core flowpath 52 between and to the inner platform 80A and the outer platform 80B. Each of the stator vanes 94 may also be connected to the inner platform 80A and/or the outer platform 80B. The stator vane array 82 and its stator vanes 94 are configured to turn and/or otherwise condition the combustion products exiting the combustion chamber 60 for interaction with a first stage of the HPT rotor 41 (see FIG. 1).

Figure 5:
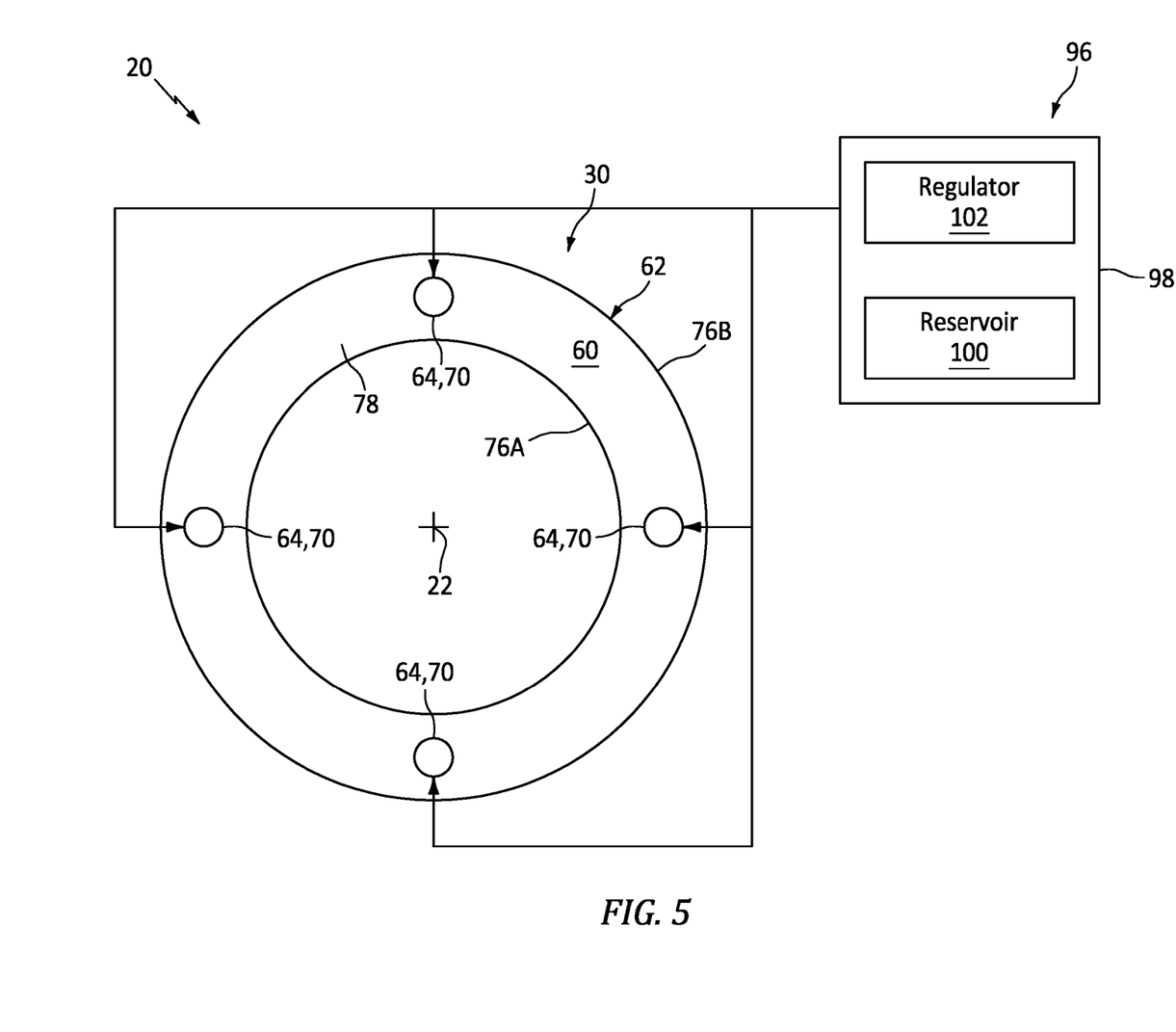
FIG. 5 is a schematic illustration of a fuel system configured with the combustor section.

Referring to FIG. 5, the turbine engine 20 includes a fuel system 96 for delivering the fuel to the combustor 62. This fuel system 96 includes a fuel source 98 and the one or more fuel injectors 70. The fuel source 98 of FIG. 5 includes a fuel reservoir 100 and/or a fuel flow regulator 102; e.g., a valve and/or a pump. The fuel reservoir 100 is configured to store the fuel before, during and/or after turbine engine operation. The fuel reservoir 100, for example, may be configured as or otherwise include a tank, a cylinder, a pressure vessel, a bladder or any other type of fuel storage container. The fuel flow regulator 102 is configured to direct and/or meter a flow of the fuel from the fuel reservoir 100 to one or more or all of the fuel injectors 70. The fuel injectors 70 may be arranged circumferentially about the axial centerline 22 in an array. Each fuel injector 70 is configured to direct the fuel received from the fuel source 98 into the combustion chamber 60 for combustion.

The fuel delivered by the fuel system 96 may be a non-hydrocarbon fuel; e.g., a hydrocarbon free fuel. Examples of the non-hydrocarbon fuel include, but are not limited to, hydrogen fuel (e.g., hydrogen ($H_2$) gas) and ammonia fuel (e.g., ammonia ($NH_3$) gas). The turbine engine 20 of FIG. 1 may thereby be configured as a non-hydrocarbon turbine engine; e.g., a hydrocarbon free turbine engine. The present disclosure, however, is not limited to non-hydrocarbon turbine engines. The fuel delivered by the fuel system 96, for example, may alternatively be a hydrocarbon fuel such as, but not limited to, kerosene or jet fuel. The turbine engine 20 of FIG. 1 may thereby be configured as a hydrocarbon turbine engine. Alternatively, the fuel system 96 may be configured as a multi-fuel system operable to deliver, individually or in combination, multiple different fuels (e.g., a non-hydrocarbon fuel and a hydrocarbon fuel, etc.) for combustion within the combustion chamber 60. The turbine engine 20 of FIG. 1 may thereby be configured as a multi-fuel turbine engine; e.g., a dual-fuel turbine engine. However, for ease of description, the fuel delivered by the fuel system 96 may be described below as the non-hydrocarbon fuel; e.g., the hydrogen fuel.

Figure 6:
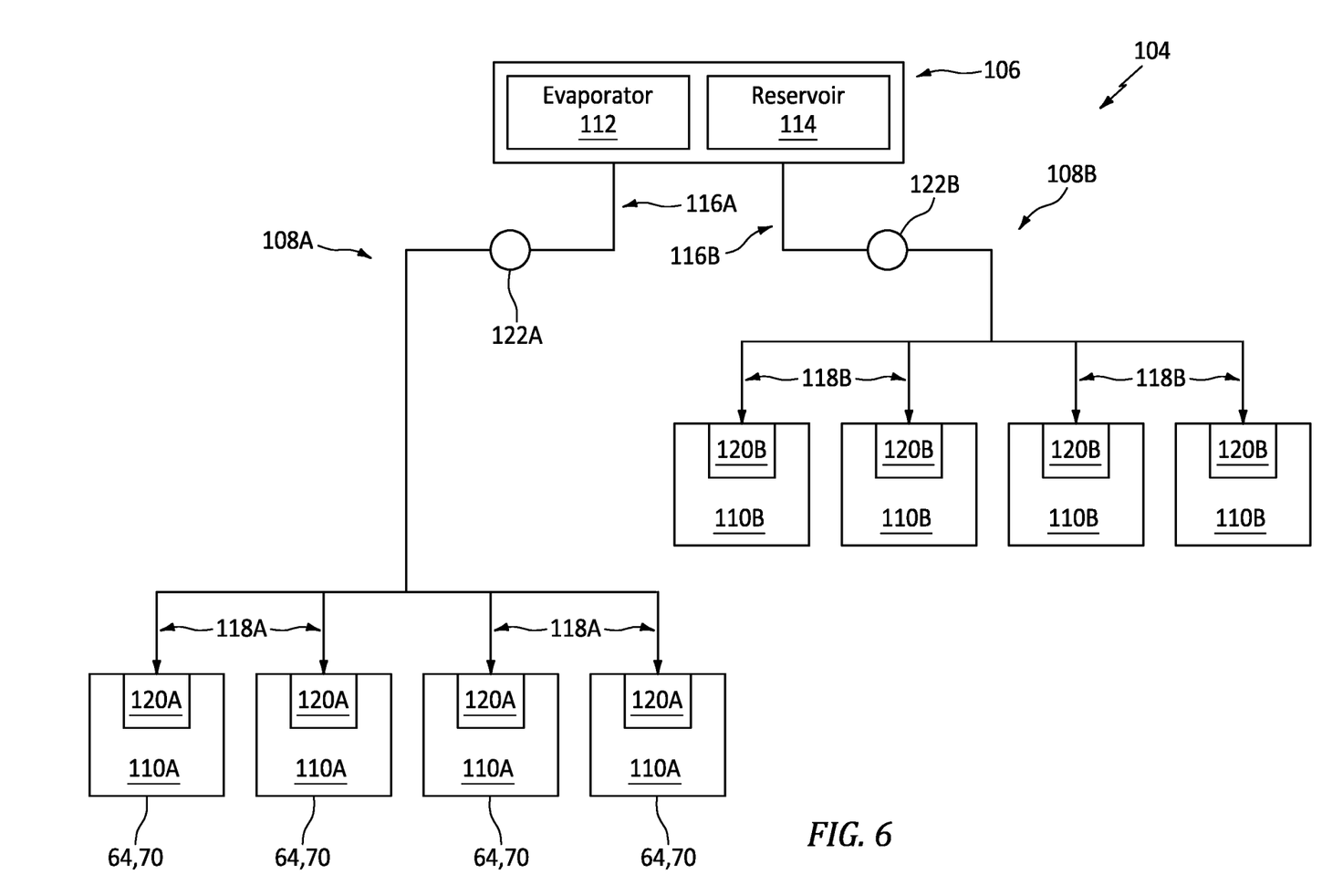
FIG. 6 is a schematic illustration of an injector system configured with the combustor section.

Referring to FIG. 6, the turbine engine 20 includes an injection system 104 for modulating fuel and/or air flow within the turbine engine 20. The injection system 104 of FIG. 6, for example, includes a steam source 106, one or more steam delivery circuits 108A and 108B (generally referred to as "108") and one or more fluid injectors 110A and 110B (generally referred to as "110").

The steam source 106 is configured to provide the steam to the steam delivery circuits 108 during turbine engine operation and, more particularly, during steam system operation. The steam source 106, for example, may be configured as or otherwise include an evaporator 112, which may be or otherwise include a fluid-to-fluid heat exchanger and/or an electrical heater. The evaporator 112 is configured to evaporate water into the steam during steam system operation. The water may be received from various sources. The steam source 106 of FIG. 6, for example, includes a water reservoir 114 fluidly coupled with and upstream of the evaporator 112. This water reservoir 114 is configured to store the water before, during and/or after turbine engine operation. Examples of the water reservoir 114 include, but are not limited to, a tank, a cylinder, a pressure vessel, a bladder or any other type of water storage container. Briefly, the water may be supplied to the water reservoir 114 by recovering water vapor from the combustion products flowing through the core flowpath 52 (see FIG. 1) and/or from another water source onboard or offboard an aircraft.

Each steam delivery circuit 108A, 108B of FIG. 6 includes a supply circuit 116A, 116B (generally referred to as "116"), one or more feed circuits 118A, 118B (generally referred to as "118") and one or more steam ejectors 120A, 120B (generally referred to as "120"), where each of the circuit elements 118A and 120A, 118B and 120B is associated with a respective one of the fluid injectors 110A, 110B. Each supply circuit 116 of FIG. 6 extends from an outlet from the steam source 106 to an interface with the respective feed circuits 118 such as a manifold. At the interface, the feed circuits 118 may be fluidly coupled in parallel to and downstream of the respective supply circuit 116. Each of the feed circuits 118 extends from the interface to an inlet of a respective one of the steam ejectors 120. Each steam delivery circuit 108 thereby fluidly couples the steam source 106 to the respective steam ejectors 120.

The steam directed through the steam delivery circuits 108A and 108B may be independently regulated. Each steam delivery circuit 108A, 108B of FIG. 6, for example, includes a respective steam flow regulator 122A, 122B (generally referred to as "122"). Each steam flow regulator 122 is arranged (e.g., fluidly coupled inline) with the respective supply circuit 116. Each steam flow regulator 122 is configured to selectively direct and/or meter a flow of the steam from the steam source 106 to a respective set of one or more steam ejectors 120. For example, each steam flow regulator 122 may be configured as or otherwise include a control valve. This control valve may fully open, may fully close and/or may move to one or more partially open positions. While each steam flow regulator 122 is illustrated in FIG. 6 as being part of the respective supply circuit 116, that steam flow regulator 122 may alternatively be arranged at the interface between the supply circuit 116 and the respective feed circuits 118, at an inlet to the respective supply circuit 116, or otherwise. One or more or all of the feed circuits 118 in one or each steam delivery circuit 108 may also or alternatively be provided with its own steam flow regulator 122. Furthermore, it is contemplated the steam delivered to one or more or all of the steam ejectors 120 in one or each steam delivery circuit 108 may still also or alternatively be regulated by adjusting an amount of steam provided (e.g., produced) by the steam source 106.

Figure 7:
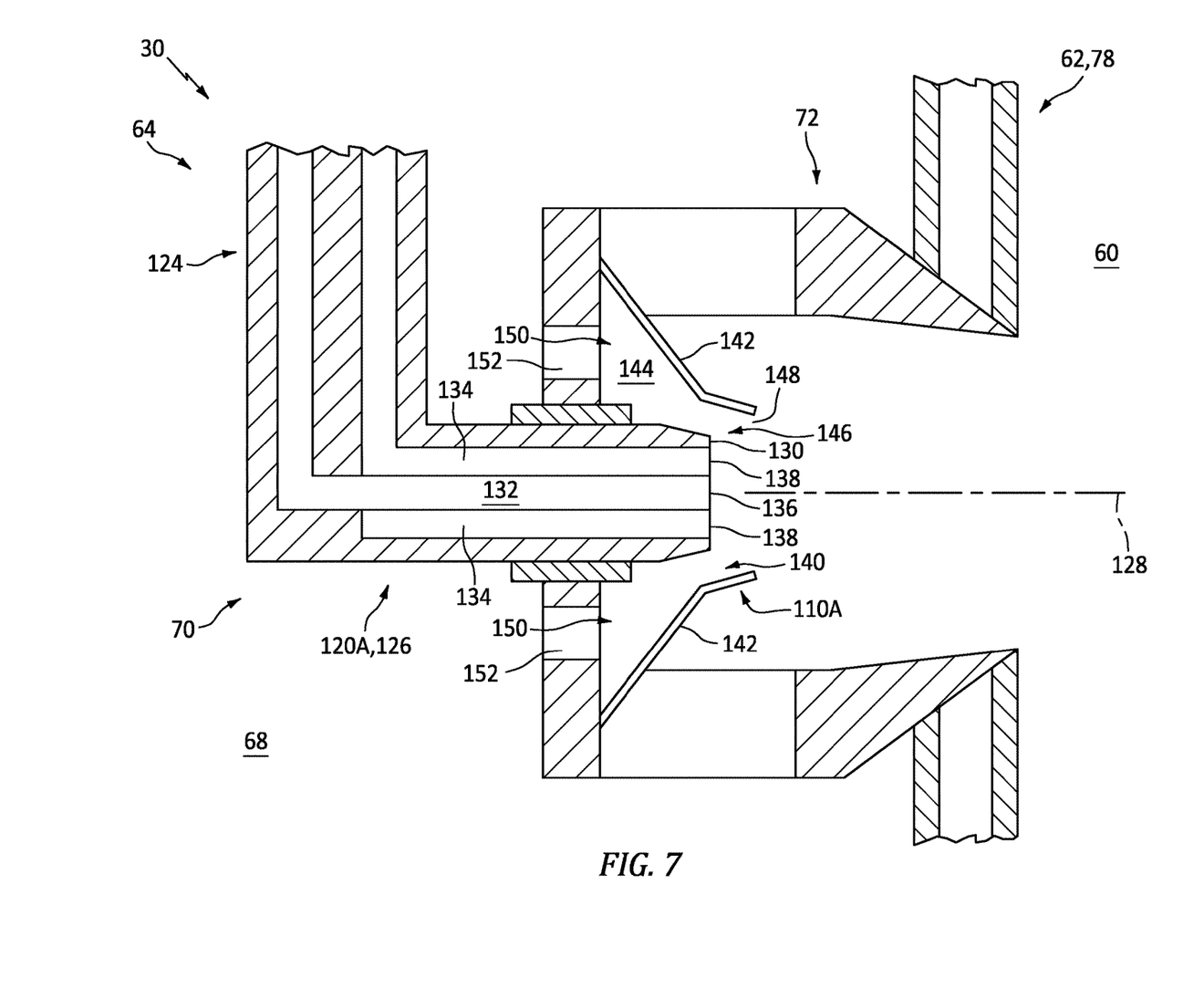
FIG. 7 is a partial sectional illustration of the combustor section at an upstream fluid injector.

Referring to FIG. 7, each upstream ejector 120A may be configured as part of a respective one of the fuel injector assemblies 64 and, more particularly, a respective one of the fuel injectors 70. The fuel injector 70 of FIG. 7, for example, includes an injector stem 124 and an injector nozzle 126. Referring to FIG. 2, the injector stem 124 is configured to support and route the fuel from the fuel source 98 and the steam from the steam source 106 to the injector nozzle 126. Referring again to FIG. 7, the injector nozzle 126 is connected to and may be cantilevered from the injector stem 124. The injector nozzle 126 of FIG. 7 projects axially along a centerline axis 128 of the injector nozzle 126 out from the injector stem 124, partially into the respective air swirler structure 72, to a tip 130 of the injector nozzle 126.

The injector nozzle 126 of FIG. 7 includes an internal fuel passage 132 and an (e.g., annular) internal steam passage 134. The fuel passage 132 extends axially within the injector nozzle 126 along the axis 128 to an outlet orifice 136 from the fuel passage 132 at (e.g., on, adjacent, proximate) the nozzle tip 130. The steam passage 134 extends axially within the injector nozzle 126 along the axis 128 to an (e.g., annular) outlet orifice 138 from the steam passage 134 at the nozzle tip 130. The steam passage 134 of FIG. 7 extends circumferentially about (e.g., circumscribe) the fuel passage 132. The steam outlet orifice 138 of FIG. 7 extends circumferentially about (e.g., circumscribes) the fuel outlet orifice 136 where the steam outlet orifice 138 and the fuel outlet orifice 136 are axially aligned. However, where the steam outlet orifice 138 is axially recessed from the fuel outlet orifice 136, the steam outlet orifice 138 may extend circumferentially about (e.g., circumscribe) the fuel passage 132. Where the fuel outlet orifice 136 is axially recessed from the steam outlet orifice 138, the steam passage 134 may extend circumferentially about (e.g., circumscribe) the fuel outlet orifice 136.

The nozzle tip 130 of FIG. 7 is disposed within an inner passage 140 of the upstream fluid injector 110A ("upstream injector"). This upstream injector 110A may be configured as part of, connected to and/or otherwise arranged with the respective air swirler structure 72. A body of the upstream injector 110A of FIG. 7 includes (e.g., is formed by) a tubular sidewall 142. This sidewall 142 extends axially along the axis 128 from an upstream (e.g., axial forward) end of the upstream injector 110A to a downstream (e.g., axial aft) end of the upstream injector 110A, where the axis 128 may also be a centerline axis of the upstream injector 110A and its sidewall 142. The sidewall 142 extends circumferentially about (e.g., completely around) the axis 128. The sidewall 142 may thereby (e.g., completely or partially) form the inner passage 140 within/through the upstream injector 110A. The sidewall 142 of FIG. 7, for example, forms an outer peripheral boundary of the inner passage 140.

The inner passage 140 of FIG. 7 includes an upstream section 144 and a downstream section 146. The upstream section 144 may radially taper inwards towards the axis 128 as the upstream section 144 extends axially along the axis 128 towards an outlet orifice 148 from the inner passage 140 at the upstream injector downstream end. More particularly, the upstream section 144 of FIG. 7 radially tapers inward as the upstream section 144 extends axially along the axis 128 to the downstream section 146. The downstream section 146 may also radially taper inwards towards the axis 128 as the downstream section 146 extends axially along the axis 128 towards (e.g., to) the inner passage outlet orifice 148/the upstream injector downstream end. However, it is contemplated this downstream section 146 may alternatively have a uniform (e.g., constant) radius along the axis 128 in other embodiments.

The injector nozzle 126 and its upstream ejector 120A project axially along the axis 128 partially into the upstream injector 110A and its inner passage 140. The upstream ejector 120A of FIG. 7, for example, projects axially into the inner passage 140 to or about an intersection between the upstream section 144 and the downstream section 146. More particularly, the upstream ejector 120A of FIG. 7 projects axially through the upstream section 144 and partially into the downstream section 146, for example slightly axially downstream of the intersection between the inner passage sections 144 and 146.

A port 150 is formed radially between the injector nozzle 126 and its upstream ejector 120A and the upstream injector 110A and its sidewall 142. This port 150 may be an annulus. The port 150 of FIG. 7, for example, extends circumferentially about (e.g., completely around) the injector nozzle 126 and its upstream ejector 120A. The upstream injector 110A of FIG. 7 and its sidewall 142 extend circumferentially about (e.g., completely around) the port 150. The port 150 fluidly couples the diffuser plenum 68 (e.g., via another port 152 in the air swirler structure 72) to the inner passage 146 downstream of the nozzle tip 130.

With the foregoing arrangement, the respective fuel injector assembly 64 may be configured with a Venturi pump. For example, during combustion section operation, the injector nozzle 126 may direct the fuel and the steam into the inner passage 140 of the upstream injector 110A. This upstream injector 110A may also receive compressed core air from the diffuser plenum 68. The upstream injector 110A may direct the fuel, the steam and the compressed core air through the air swirler structure 72 and into the combustion chamber 60.

As the steam (and the fuel) flow through the inner passage 140, the steam (and the fuel) may generate a Bernoulli vacuum and draw additional compressed core air from the diffuser plenum 68 into and through the inner passage 140. This flow of the compressed core air through the inner passage 140 into the combustion chamber 60 may be modulated by regulating the flow of the steam into/through the inner passage 140. For example, the flow of the compressed core air may be increased by increasing (or starting) the flow of the steam into the inner passage 140. The flow of the compressed core air may be decreased by decreasing (or stopping) the flow of the steam into the inner passage 140. Thus, the steam may be utilized to enhance compressed core air flow into/through the air swirler structure 72. Of course, the steam may also or alternatively be utilized to enhance fuel flow into/through the air swirler structure 72 by drawing additional fuel from the fuel passage 132.

Figure 8:
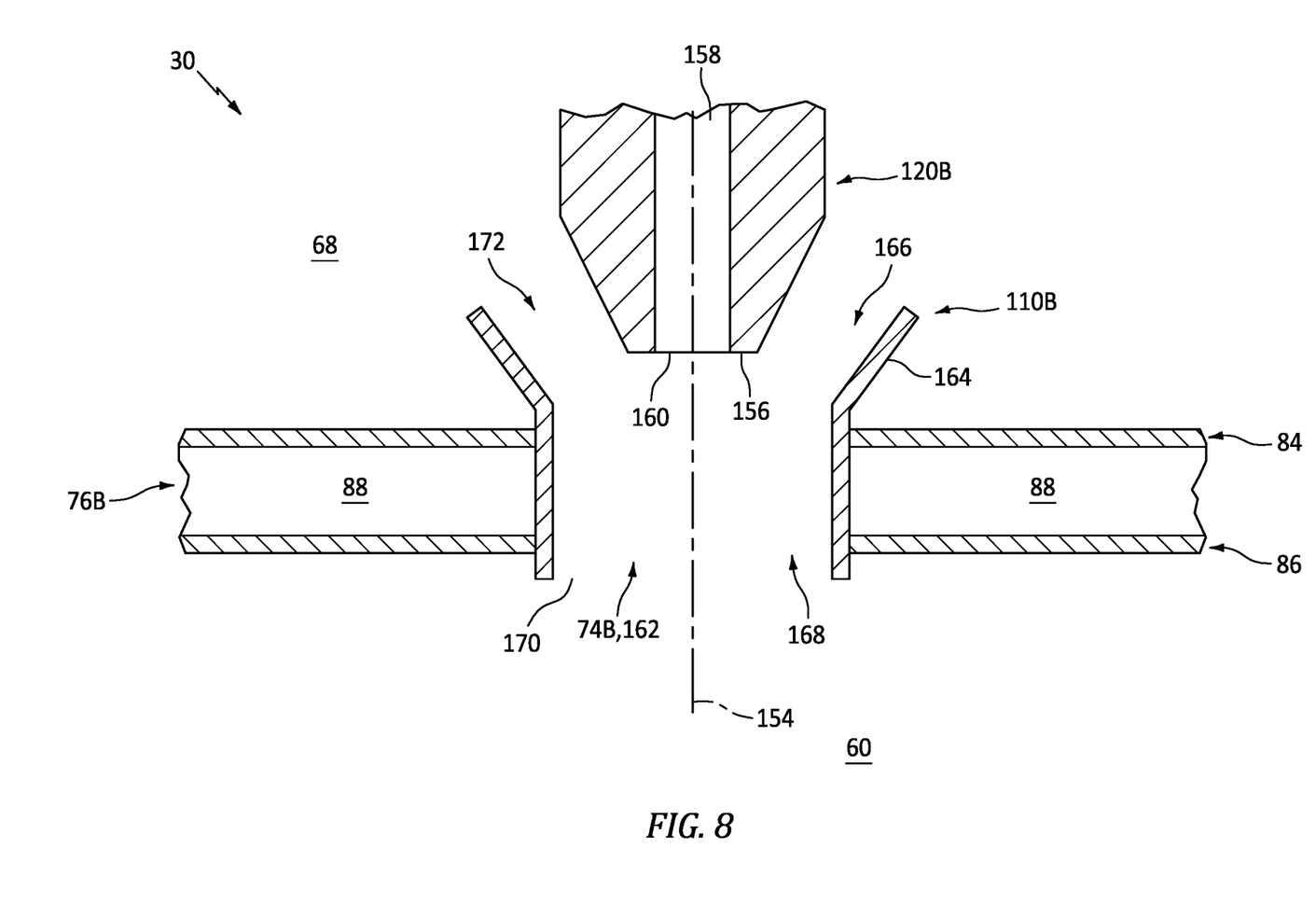
FIG. 8 is partial sectional illustration of the combustor section at a downstream fluid injector.

Referring to FIG. 8, each downstream ejector 120B may be configured with a respective one of the quench apertures 74; e.g., one of the outer quench apertures 74B. The downstream ejector 120B of FIG. 8 projects axially along a centerline axis 154 of the downstream ejector 120B (e.g., inward from the engine housing 32 and its inner case 34), partially into the respective quench aperture 74B, to a tip 156 of the downstream ejector 120B.

The downstream ejector 120B of FIG. 8 includes an internal steam passage 158. This steam passage 158 extends axially within the downstream ejector 120B along the axis 154 to an outlet orifice 160 from the steam passage 158 at the ejector tip 156.

The ejector tip 156 of FIG. 8 is disposed within an inner passage 162 of the downstream fluid injector 110B ("downstream injector"). This downstream injector 110B may be configured as part of, connected to and/or otherwise arranged with the combustor 62 and its outer wall 76B. A body of the downstream injector 110B of FIG. 8 includes (e.g., is formed by) a tubular sidewall 164; e.g., a quench aperture grommet. This sidewall 164 extends axially along the axis 154 from an upstream (e.g., radial outer) end of the downstream injector 110B to a downstream (e.g., radial inner) end of the downstream injector 110B, where the axis 154 may also be a centerline axis of the sidewall 164 and/or the respective quench aperture 74B. The sidewall 164 extends circumferentially about (e.g., completely around) the axis 154. The sidewall 164 may thereby (e.g., completely or partially) form the inner passage 162 within/through the downstream injector 110B, where the inner passage 162 of FIG. 8 is also the respective quench aperture 74B. The sidewall 164 of FIG. 8, for example, forms an outer peripheral boundary of the inner passage 162/the quench aperture 74B.

The inner passage 162 of FIG. 8 includes an upstream section 166 and a downstream section 168. The upstream section 166 may radially taper inwards towards the axis 154 as the upstream section 166 extends axially along the axis 154 towards an outlet orifice 170 from the inner passage 162 at the downstream injector downstream end. More particularly, the upstream section 166 of FIG. 8 radially tapers inward as the upstream section 166 extends axially along the axis 154 to the downstream section 168. The downstream section 168 has a uniform (e.g., constant) radius along the axis 154 from the upstream section 166 to the inner passage outlet orifice 170/the downstream injector downstream end. However, it is contemplated the downstream section 168 may alternatively radially taper inwards towards the axis 154 as the downstream section 168 extends axially along the axis 154 towards (e.g., to) the inner passage outlet orifice 170/the downstream injector downstream end.

The downstream ejector 120B project axially along the axis 154 partially into the downstream injector 110B and its inner passage 162. The downstream ejector 120B of FIG. 8, for example, projects axially into the inner passage 162 to or about an intersection between upstream section 166 and the downstream section 168. More particularly, the downstream ejector 120B of FIG. 8 projects partially axially into the upstream section 166, for example slightly axially upstream of the intersection between the inner passage sections 166 and 168.

A port 172 is formed radially between the downstream ejector 120B and its downstream injector 110B. This port 172 may be an annulus. The port 172 of FIG. 8, for example, extends circumferentially about (e.g., completely around) the downstream ejector 120B. The downstream injector 110B of FIG. 8 and its sidewall 164 extend circumferentially about (e.g., completely around) the port 172. The port 172 fluidly couples the diffuser plenum 68 to the inner passage 162 downstream of the ejector tip 156.

With the foregoing arrangement, the respective quench aperture 74B may be configured with a Venturi pump. For example, during combustion section operation, the downstream ejector 120B may direct steam into the inner passage 162 of the downstream injector 110B. This downstream injector 110B may also receive compressed core air from the diffuser plenum 68. The downstream injector 110B may direct the steam and the compressed core air through the outer wall 76B and into the combustion chamber 60. As the steam flows through the inner passage 162, the steam may generate a Bernoulli vacuum and draw additional compressed core air from the diffuser plenum 68 into and through the inner passage 162. This flow of the compressed core air through the inner passage 162 into the combustion chamber 60 may be modulated by regulating the flow of the steam into/through the inner passage 162. For example, the flow of the compressed core air may be increased by increasing (or starting) the flow of the steam into the inner passage 162. The flow of the compressed core air may be decreased by decreasing (or stopping) the flow of the steam into the inner passage 162. Thus, the steam may be utilized to enhance compressed core air flow into/through the respective quench aperture 74B.

While the injection system 104 of FIG. 6 (see also FIG. 2) is configured with multiple steam delivery circuits 108, the present disclosure is not limited to such an exemplary arrangement. For example, the injection system 104 may be configured without the steam delivery circuit 108A and its corresponding upstream ejectors 120A. In another example, the injection system 104 may be configured without the steam delivery circuit 108B and its corresponding downstream ejectors 120B. In addition or alternatively, the injection system 104 may be configured with one or more additional stream delivery circuits and corresponding steam injectors; e.g., for the quench apertures 74A and/or other components/structures along the core flowpath 52.

Figure 9:
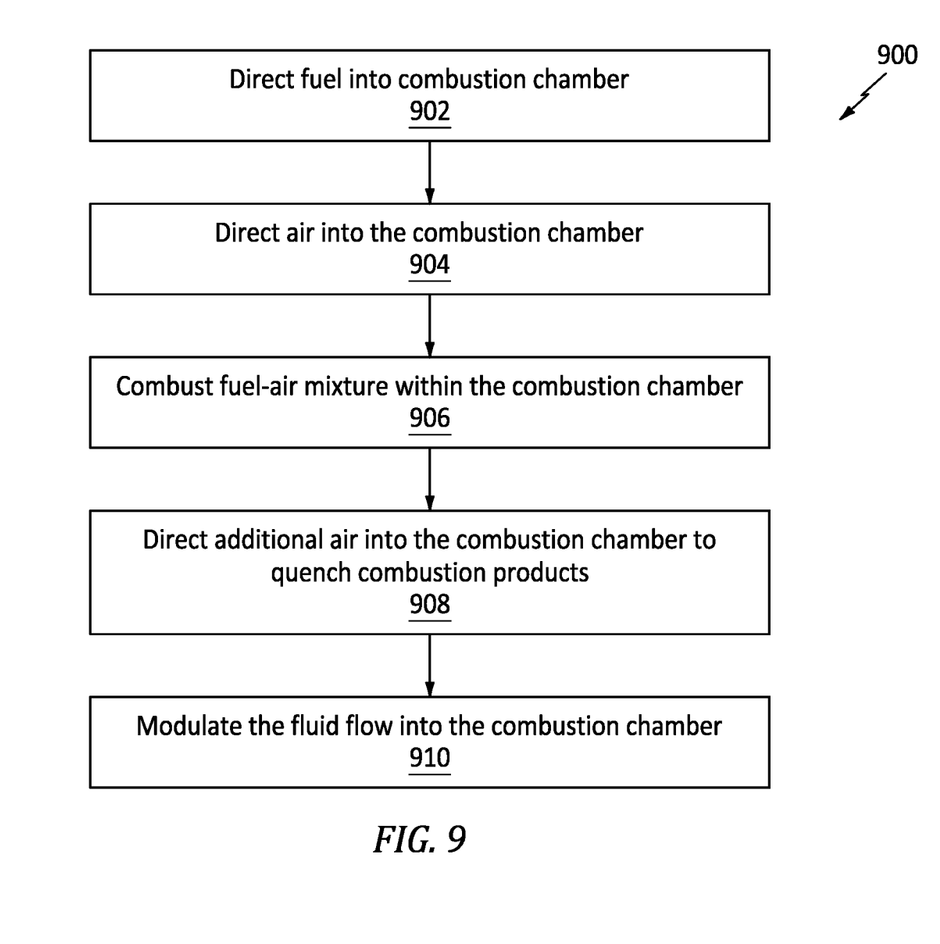
FIG. 9 is a flow diagram of a method for operating a gas turbine engine.

FIG. 9 is a flow diagram of a method 900 for operating a turbine engine. For ease of description, the operating method 900 is described below with respect to the turbine engine 20 of FIG. 1 and its injection system 104 of FIG. 6. The operating method 900 of the present disclosure, however, is not limited to such exemplary arrangements.

In step 902, fuel is directed into the combustion chamber 60. The fuel, for example, may be injected into the combustion chamber 60 through the injector nozzles 126.

In step 904, a first portion of compressed core air is directed into the combustion chamber 60. This first portion of the compressed core air is injected into the combustion chamber 60 along with the fuel. The first portion of the compressed core air, for example, is directed through the air swirler structures 72 to facilitate mixing the fuel with the compressed core air to provide the fuel-air mixture.

In step 906, the fuel-air mixture is combusted within combustor 62. The fuel-air mixture, for example, may be ignited by the one or more igniters (not shown). The combustion products generated from the ignition of the fuel-air mixture subsequently flow downstream within the core flowpath 52 and its combustion chamber 60 towards the stator vane array 82.

In step 908, a second portion of the compressed core air is directed into the combustion chamber 60. This second portion of the compressed core air, for example, is directed through the downstream injectors 110B/the quench apertures 74B as well as through the quench apertures 74A to quench the combustion products.

In step 910, fluid flow into the combustion chamber 60 is modulated. For example, the flow of the fuel and/or the first portion of compressed core air directed into the combustion chamber may be modulated by regulating the flow of steam into the upstream injectors 110A. The flow of the fuel and/or the first portion of compressed core air, for example, may be increased and/or decreased as described above. In addition or alternatively, the flow of the second portion of compressed core air directed into the combustion chamber 60 may be modulated by regulating the flow of steam into the downstream injectors 110B. The flow of the second portion of compressed core air, for example, may be increased and/or decreased as described above. This modulation of the fluid flow may be performed to enhance the combustion process during select aircraft maneuvers and/or during select modes of turbine engine operation.

The injection system 104 may be included in various turbine engines other than the one described above. The injection system 104, for example, may be included in a geared turbine engine where a geartrain connects one or more shafts to one or more rotors in a fan section, a compressor section and/or any other engine section. Alternatively, the injection system 104 may be included in a turbine engine configured without a geartrain; e.g., a direct drive turbine engine. The injection system 104 may be included in a geared or non-geared turbine engine configured with a single spool, with two spools (e.g., see FIG. 1), or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
a combustor comprising a combustion chamber and a diffuser plenum; and
an injection system comprising:
an injector comprising an inner passage fluidly coupled with the combustion chamber,
a steam ejector, and
a port extending circumferentially about the injector and the steam ejector, and the port fluidly coupling the diffuser plenum to the inner passage;
wherein:
the injection system is configured to direct steam out of the steam ejector into the injector, the injection system is configured to direct fluid and the steam into the combustion chamber through the injector, and the injection system is configured to modulate a flow of the fluid into the combustion chamber through the injector by regulating a flow of the steam out of the steam ejector into the combustion chamber through the injector;
at least a portion of the inner passage radially tapers inward towards an axis of the steam ejector as the portion of the inner passage extends axially from the port along the axis of the steam ejector towards the combustion chamber; and
the steam ejector projects axially along the axis of the steam ejector into the portion of the inner passage.

2. The assembly of claim 1, wherein the injection system is configured to increase the flow of the fluid into the combustion chamber through the injector by increasing the flow of the steam into the combustion chamber through the injector.

3. The assembly of claim 1, wherein the injection system is configured to decrease the flow of the fluid into the combustion chamber through the injector by decreasing the flow of the steam into the combustion chamber through the injector.

4. The assembly of claim 1, wherein
the injector further comprises a sidewall forming an outer peripheral boundary of the portion of the inner passage; and
an annulus extends radially between the steam ejector and the sidewall, and the annulus circumscribes the steam ejector.

5. The assembly of claim 1, wherein
the combustor is disposed within a diffuser plenum;
the injector fluidly couples the diffuser plenum to the combustion chamber; and
the fluid comprises compressed air within the diffuser plenum.

6. The assembly of claim 1, further comprising an air swirler structure comprising the injector.

7. The assembly of claim 1, further comprising a fuel injector assembly comprising the injector.

8. The assembly of claim 1, wherein the injector forms a quench aperture in a wall of the combustor.

9. The assembly of claim 1, further comprising:
a compressed air source; and
the fluid is compressed air received from the compressed air source.

10. The assembly of claim 1, further comprising:
a fuel source; and
the fluid is fuel received from the fuel source.

11. The assembly of claim 1, wherein the steam ejector extends partially into the portion of the inner passage that radially tapers inward towards the axis of the steam ejector to a tip of the steam ejector.

12. An assembly for a turbine engine, comprising:
a structure comprising an internal volume and a plenum; and
an injection system comprising:
an injector comprising an inner passage fluidly coupled with internal volume,
a steam ejector projecting partially into the inner passage of the injector, and
a port extending circumferentially about the injector and the steam ejector, and the port fluidly coupling the plenum to the internal volume, the injection system configured to direct fluid and steam into the internal volume through the inner passage of the injector, and the injection system configured to at least one of
increase a flow of the fluid through the inner passage of the injector into the internal volume by starting staring or increasing a flow of the steam out of the steam ejector into the inner passage of the injector; or
decrease the flow of the fluid through the inner passage of the injector into the internal volume by stopping or decreasing the flow of the steam out of the steam ejector into the inner passage of the injector,
wherein at least a portion of the inner passage radially tapers inward towards an axis of the steam ejector as the portion of the inner passage extends axially along the axis of the steam ejector towards the internal volume.

13. The assembly of claim 12, further comprising:
a turbine engine core comprising a compressor section, a combustor section, a turbine section and a core flowpath;
the core flowpath extending sequentially through the compressor section, the combustor section and the turbine section, and the core flowpath comprising the internal volume.

14. The assembly of claim 12, wherein the steam ejector projects axially along the axis of the steam ejector into the portion of the inner passage.

15. A method for operating a turbine engine, comprising:
directing fluid and steam into a combustion chamber of a combustor within the turbine engine through an injector, the turbine engine comprising:
a combustor and an injection system,
the combustor comprising the combustion chamber and a diffuser plenum, and
the injection system comprising:
the injector comprising an inner passage fluidly coupled with the combustion chamber,
a steam ejector, and
a port extending circumferentially about the injector and the steam ejector, and the port fluidly coupling the diffuser plenum to the inner passage; and
modulating a flow of the fluid into the combustion chamber through the injector by regulating a flow of the steam out of the steam ejector into the injector,
wherein:
at least a portion of the inner passage radially tapers inward towards an axis of the steam ejector as the portion of the inner passage extends axially along the axis of the steam ejector towards the combustion chamber; and
the injection system is configured to direct the steam out of the steam ejector into the injector.

16. The method of claim 15, wherein the modulating comprises increasing the flow of the fluid into the combustion chamber through the injector by starting or increasing the flow of the steam into the injector.

17. The method of claim 15, wherein the modulating comprises decreasing the flow of the fluid into the combustion chamber through the injector by stopping or decreasing the flow of the steam into the injector.

18. The method of claim 15, further comprising:
injecting a fuel-air mixture into the combustion chamber;
combusting the fuel-air mixture to generate combustion products; and
quenching the combustion products within the combustion chamber using the flow of the fluid, the fluid comprising compressed air.

19. The method of claim 15, further comprising:
injecting fuel into the combustion chamber;
mixing the fuel with the fluid to provide a fuel-air mixture, the fluid comprising compressed air; and
combusting the fuel-air mixture within the combustion chamber.

20. The method of claim 15, further comprising:
directing compressed air into the combustion chamber;
mixing the fluid with the compressed air to provide a fuel-air mixture, the fluid comprising fuel; and
combusting the fuel-air mixture within the combustion chamber.

* * * * *